United States Patent [19]
Pritchett

[11] 3,745,378
[45] July 10, 1973

[54] ZERO VOLTAGE FIRING PROPORTIONAL CONTROLLER

[75] Inventor: Wayne W. Pritchett, Morris Plains, N.J.

[73] Assignee: RFL Industries Inc., Boonton, N.J.

[22] Filed: Jan. 28, 1972

[21] Appl. No.: 221,739

[52] U.S. Cl. ........ 307/252 B, 307/252 UA, 307/310
[51] Int. Cl. .......................................... H03k 17/72
[58] Field of Search .................... 307/252 B, 252 N, 307/252 UA, 310; 323/22, 34, 38

[56] References Cited
UNITED STATES PATENTS

| | | | |
|---|---|---|---|
| 3,335,291 | 8/1967 | Gutzwiller | 307/252 B |
| 3,443,124 | 5/1969 | Pinckaers | 307/252 B |
| 3,590,275 | 6/1971 | Fisher | 307/252 B |
| 3,633,094 | 1/1972 | Clements | 307/252 UA |
| 3,668,422 | 6/1972 | Pascente | 307/252 B |

Primary Examiner—John Zazworsky
Attorney—Rudolph J. Jurick

[57] ABSTRACT

A proportional controller in which a triac is controlled by a zero-voltage switch responsive to changes in a sensor having a negative temperature coefficient of resistance. The triac supplies electrical power to a load and the circuit is so arranged that for every positive half-cycle of power which is applied to the load there will be an equal and opposite negative half-cycle immediately following.

5 Claims, 1 Drawing Figure

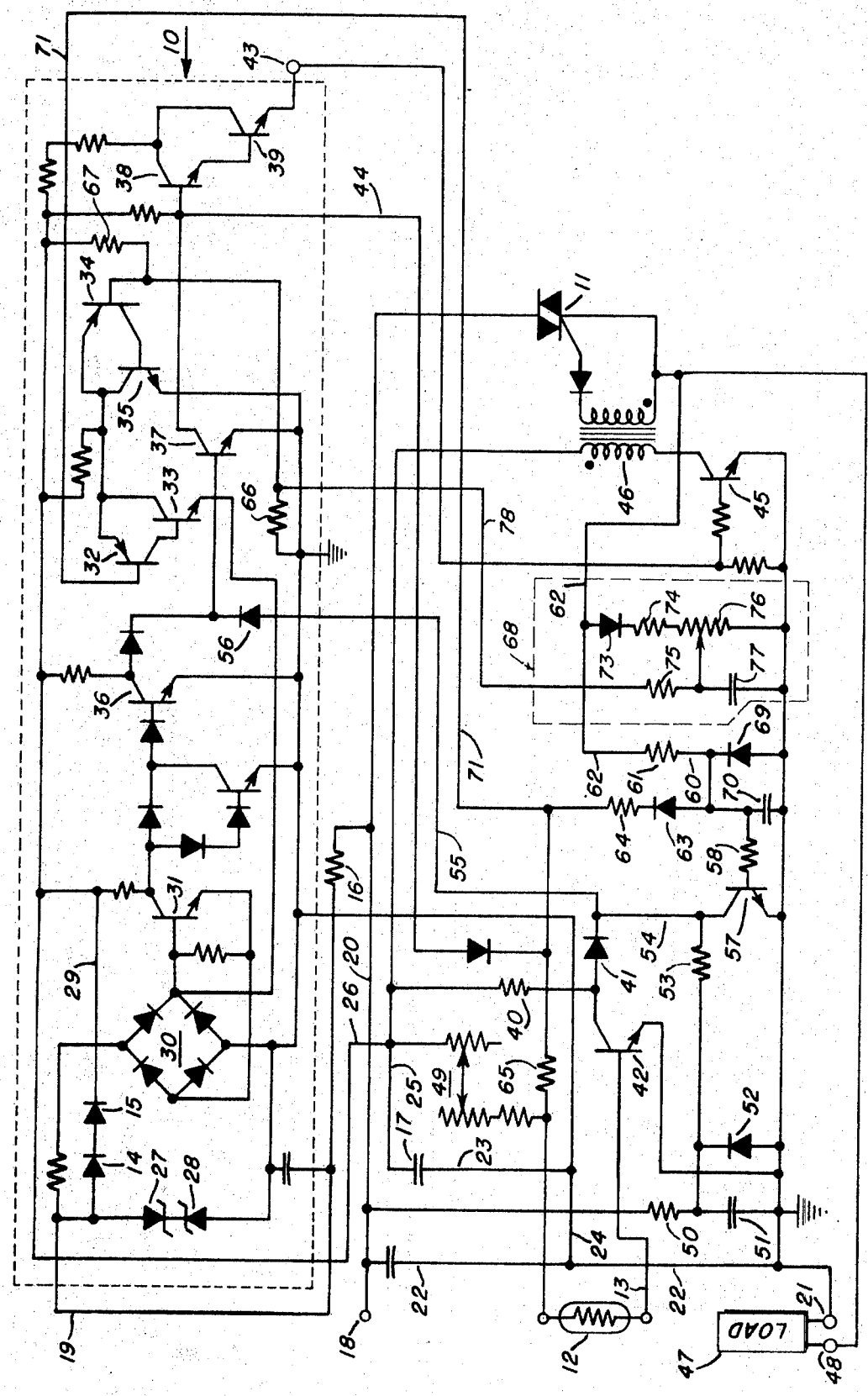

ZERO VOLTAGE FIRING PROPORTIONAL CONTROLLER

BACKGROUND OF THE INVENTION

Numerous circuits are available to provide a gating signal to a triac for the control of electrical power to a load. The gating of the triac is accomplished by one of two means, namely, phase-firing or zero-voltage firing. In a phase-firing arrangement, the triac is gated on after a specified time delay into each power line cycle. A major disadvantage of phase-firing is the production of radio frequency interference which upsets the operation of computers and test equipment in the general vicinity of the controller. In the zero-voltage firing arrangement, the triac is triggered by an integrated circuit, zero-voltage switch in such manner that power is supplied to the load in discrete steps. Since there are no abrupt changes in the current delivered to the load, minimal radio frequency interference results. Although certain available zero-voltage switches provide satisfactory operation in many applications, they are subject to half-cycling, that is, the switch may cause the triac to deliver only positive, or only negative, half-cycles of the power line voltage in certain instances. The resultant dc in supply and load transformers can cause damaging by current surges.

A controller made in accordance with invention includes a zero-voltage switch controlling the firing of a triac in such manner that when the switch fires the triac on a positive half-cycle of the power line voltage, it is electrically bound to fire the triac on the succeeding negative half-cycle of the voltage.

SUMMARY OF THE INVENTION

A proportional controller in which the firing of a triac is controlled by a zero-voltage switch, thereby to provide electrical power to a load in proportion to the variation of a sensor from a predetermined or set point value. Logic circuitry keyed to the power line provides a phase-shifted, inhibit voltage which normally clamps the pulse output of the zero-voltage switch for all negative half-cycles of the power line voltage. However, if the triac is fired during a positive half-cycle of the line voltage, the negative half-cycle inhibit voltage is clamped to ground, thereby conditioning the zero-voltage switch to fire the triac on a negative half-cycle. In order to assure negative half-cycle firing, an unbalancing voltage is applied to the bridge circuit of the zero-voltage switch during the period when the inhibit voltage is clamped to ground.

An object of this invention is the provision of an arrangement for preventing half-cycling in a zero-voltage switch controlling the firing of a triac.

An obect of this invention is the provision of a controller for supplying ac power to a load through a triac and in which for every positive half-cycle of power applied to the load there is an equal and opposite negative half-cycle immediately following.

An object of this invention is the provision of zero-voltage firing proportional temperature controller in which ac electrical power is supplied to a load in discrete steps, each step consisting of integral cycles of the power line voltage.

The above stated and other objects and advantages of the invention will become apparent from the following description when taken with the accompanying drawing. It will be understood, however, that the drawing is for purposes of illustration and is not to be construed as defining the scope or limits of the invention, reference being had for the latter purpose to the claims appended hereto.

BRIEF DESCRIPTION OF THE DRAWING

The single figure of the drawing is a circuit diagram of a zero-voltage firing proportional controller made in accordance with this invention.

DESCRIPTION OF PREFERRED EMBODIMENT

Referring to the drawing, there is shown a conventional integrated circuit, zero-voltage switch 10 which controls the firing of a triac 11 in response to temperature changes in the thermistor 12 having a negative temperature coefficient. The power supply comprises the diodes 14 and 15, and an external resistor 16 and capacitor 17, the resistor being connected between one end of the diodes and the ac line terminal 18 by the leads 19 and 20, respectively, and the capacitor being connected between the ground terminal 21 (by the leads 23 and 24) and to the other end of the diodes by the leads 25, 26 and 29. A limiter stage, consisting of the zener diodes 27 and 28, clips the incoming ac line voltage to approximately plus or minus 8 volts. This signal is applied to the zero-voltage crossing detector comprising the diode bridge 30 and transistor 31, said detector generating an output pulse during each passage of the line voltage through zero. The limiter output also is applied to the rectifying diode 14 and the capacitor 17 of the power supply, which power supply provides approximately 6 volts as the supply to the other stages of the zero-voltage switch. The on-off sensing amplifier is a differential amplifier comprising the transistor pairs 32, 33 and 34, 35. Transistors 31, 36, and 37 control the gating circuit which comprises the transistors 38 and 39. The output of the differential amplifier, appearing across the emitter lead of the transistor 33, serves to inhibit the output pulse from the transistor 31 when the thermistor 12 and the set point potentiometer 49 produce a voltage which is lower in magnitude than the voltage produced at the base of the transistor 34 by the resistors 66 and 67. An optional fail-safe circuit comprises the resistor 40, diode 41 and transistor 42. If the negative temperature coefficient sensor 12 is connected to the lead 13, as shown, then transistor 42 is turned on, thereby reverse biasing diode 41 so that no voltage appears on the lead 54. If the sensor is disconnected or becomes open circuited, transistor 42 is turned off and leads 54 and 55 becomes positive, thereby turning on the transistor 37 which inhibits the gating action of transistors 38 and 39 so that no output appears at the output terminal 43 of the zero-voltage switch. If the transistor pair 32, 33 and the tranistor 31 are turned off, an output appears at the terminal 43. Transistor 31 is in the OFF state if the incoming voltage is less than the voltage drops across the two diodes of the bridge 30 and the base to emitter voltage of the transistor 31. for either the positive or negative excursions of the line voltage. The transistor pair 32, 33 is OFF if the voltage across the thermistor 12 exceeds the reference voltage between ground and the base of the transistor 34. If either of these conditions are not satisfied, pulses are not supplied to the terminal 43. Under all other conditions, the pulses appearing on the terminal 43 are applied to the base of transistor 45 having a transformer 46 connected in its' output circuit.

The secondary of the transformer is connected to the gate circuit of the triac whereby the triac fires and applies the ac line voltage to an external load 47 connected to the line terminals 21 and 48. The circuit 68, consisting of diode 73, resistors 74, 75, potentiometer 76 and capacitor 77, serves to derive a negative feedback voltage from the load 47 energized by the triac. The negative feedback causes a slowly oscillating voltage on the capacitor 77, which voltage is fed back to the base of the transistor 34 through the resistor 75 and the lead 78. The overall result of the negative feedback is proportional action of the triac output power.

The described zero-voltage switch provides a good balance of characteristics which would provide adequate operation in many applications. Its' major disadvantage is that it half-cycles, that is, it may cause the triac to deliver only positive, or negative, half-cycles of the power line voltage under certain conditions. The resultant dc in the supply and load transformers causes current surges which may damage the triac.

The circuit now to be described provides integral-cycle firing of the triac, that is, for every positive half-cycle of power which is applied to the load there will be an equal and opposite negative half-cycle immediately following. This is accomplished by inhibiting the zero-sync pulses emanating from terminal 43 of the zero-voltage switch by logic circuitry keyed to the power line. The resistor 50, capacitor 51 rectifier 52 and resistor 53 provide a phase-shifted, inhibit voltage through the end of every positive half-cycle of the line voltage. This voltage is applied, through the leads 54 and 55, to the rectifier 56 in the zero-voltage switch and the magnitude of this voltage is sufficient to clamp the pulse output of the switch for all negative half-cycles. However, when the triac is fired during the positive half-cycle of the line voltage, a similar voltage is applied to the base of transistor 57 through resistor 58, lead 60, resistor 61 and lead 62. The power line positive half-cycle is impressed across the load 47 (connected to the line terminals 21 and 48), and across resistor 61 and rectifier 69 through the lead 62. A phase-shifted voltage appearing across the rectifier 69 and capacitor 70 is presented to the base of the transistor 57, through the resistor 58, causing this transistor to conduct, thereby clamping the inhibit voltage to ground. This clamping action allows, but does not assure, negative half-cycle firing of the triac. In order to assure negative half-cycle firing of the triac, when the inhibit voltage is clamped, an unbalancing voltage is applied to the base of transistor 32 of the zero-voltage switch, through the rectifier 63, resistor 64 and lead 71. The resistor 65 prevents the voltage of the thermistor 12 from overriding the unbalancing voltage. It will now be apparent that the half-cycling problem is solved by causing the zero-voltage switch to operate as a full-wave driver. If the switch fires the triac on a positive half-cycle, then it is electronically bound to fire on the associated negative half-cycle.

Having now described the invention what I desire to protect by letters patent is set forth in the following claims.

I claim:

1. In a controller of the class wherein the firing of a triac is controlled by output pulses generated by a zero-voltage switch as an ac line voltage passes through zero, the improvement comprising first means normally preventing the zero-voltage switch from generating output pulses on negative half-cycles of the line voltage, second means rendering the first means ineffective only if the triac has been previously fired on a positive half-cycle of the line voltage, and third means causing the zero-voltage switch to generate an output pulse on the immediately following negative half-cycle of the line voltage.

2. A proportional temperature controller energizable by an ac power line and comprising,
   a. a temperature sensor,
   b. means producing a voltage which varies in magnitude with temperature changes of said sensor,
   c. a zero-voltage switch responsive to said voltage, said switch generating output pulses during each passage of the line voltage through zero,
   d. means developing a phase-shifted inhibit voltage during each positive half-cycle of the line voltage,
   e. circuit elements applying the said inhibit voltage to the zero-voltage switch, said inhibit voltage normally preventing the switch from generating output pulses on negative half-cycles of the line voltage,
   f. a load connected to the power line through a thyristor,
   g. means firing the thyristor in response to said output pulses,
   h. means clamping the inhibit voltage only if the thyristor has been previously fired on a positive half-cycle of the line voltage, and
   i. means applying an unbalancing voltage to the zero-voltage switch when the inhibit voltage is clamped, said unbalancing voltage causing said switch to generate an output pulse on the immediately following negative half-cycle of the line voltage.

3. A proportional temperature controller energizable by an ac power line and comprising,
   a. a temperature sensor having a negative temperature coefficient of resistance,
   b. a zero-voltage switch responsive to changes in the resistance of said sensor, said switch generating output pulses during each passage of the line voltage through zero,
   c. means developing a phase-shifted inhibit voltage during each positive half-cycle of the line voltage,
   d. circuit elements applying the said inhibit voltage to the zero-voltage switch, said voltage normally preventing the switch from generating output pulses on negative half-cycles of the line voltage,
   e. a load connected to the power line through a triac,
   f. means firing the triac in response to said output pulses,
   g. means clamping the inhibit voltage only if the triac has been previously fired on a positive half-cycle of the line voltage, and
   h. means applying an unbalancing voltage to the zero-voltage switch when the inhibit voltage is clamped, said unbalancing voltage causing said switch to generate an output pulse on the immediately following negative half-cycle of the line voltage.

4. The invention as recited in claim 3 wherein the said means clamping the inhibit voltage comprises a transistor having output electrodes connected across the inhibit voltage and a base energized by the output pulses of the zero-voltage switch through a phase-shifting network.

5. The invention as recited in claim 4, wherein the said unbalancing voltage is in phase with the energizing voltage applied to the base of said transistor.

* * * * *